US012158031B2

(12) United States Patent
Hirtsiefer et al.

(10) Patent No.: US 12,158,031 B2
(45) Date of Patent: Dec. 3, 2024

(54) DEVICE FOR A SLIDING DOOR

(71) Applicant: SAMET KALIP VE MADENI ESYA SAN VE TIC. A. S, Istanbul (AR)

(72) Inventors: Artur Hirtsiefer, Neunkirchen-Seelscheid (DE); Himmet Tanriverdi, Istanbul (AR); Evren Urak, Istanbul (AR)

(73) Assignee: SAMET KALIP VE MADENI ESYA SAN VE TIC. A. S, Istanbul (TR)

( * ) Notice: Subject to any disclaimer, the term of this patent is extended or adjusted under 35 U.S.C. 154(b) by 154 days.

(21) Appl. No.: 17/801,535

(22) PCT Filed: Feb. 25, 2020

(86) PCT No.: PCT/TR2020/050146

§ 371 (c)(1),
(2) Date: Aug. 23, 2022

(87) PCT Pub. No.: WO2021/173088

PCT Pub. Date: Sep. 2, 2021

(65) Prior Publication Data

US 2023/0137064 A1 May 4, 2023

(51) Int. Cl.

*E05D 15/10* (2006.01)
*E05D 15/06* (2006.01)
*E06B 3/46* (2006.01)

(52) U.S. Cl.

CPC .. *E05D 15/1042* (2013.01); *E05D 2015/1055* (2013.01); *E05Y 2201/64* (2013.01); *E05Y 2900/20* (2013.01)

(58) Field of Classification Search

CPC ........ E05D 15/1042; E05D 2015/1055; E05D 2015/10; E05D 2015/1039; E05Y 2201/64; E05Y 2900/20

See application file for complete search history.

(56) References Cited

U.S. PATENT DOCUMENTS 8,763,205 B2 * 7/2014 Schmidhauser ........ E05D 15/10 16/92
2012/0260460 A1 * 10/2012 Schmidhauser .... E05D 15/1042 16/92

FOREIGN PATENT DOCUMENTS

| | | | |
|---|---|---|---|
| CH | 702441 | A1 | 6/2011 |
| EP | 1613831 | B1 | 9/2007 |
| EP | 3067497 | A1 | 9/2016 |
| EP | 3067497 | B1 | 3/2018 |

(Continued)

*Primary Examiner* — Kimberley S Wright

(74) *Attorney, Agent, or Firm* — Bayramoglu Law Offices LLC

(57) ABSTRACT

A device comprises a linear guide with a first rail and a second rail and being mounted onto the cabin along an upper face thereof; a further guide having a linear portion being parallel to the linear guide and an inclined portion extending transversely to the linear guide; a moving part having a first slide which slidebly runs along the linear guide and a second slide which slidebly runs along the further guide and being displaceble with respect to the first slide from a retracted position to an extracted position or vice versa and being connected to the door by means of a connecting element; the first slide comprising two sliding means running on the first rail and the second rail respectively; a space being defined between the sliding means allowing the second slide to be guided along the further guide.

20 Claims, 6 Drawing Sheets

(56) References Cited

FOREIGN PATENT DOCUMENTS

| | | | | | |
|---|---|---|---|---|---|
| GB | 1439940 | A | | 6/1976 | |
| JP | 5219733 | B2 | * | 6/2013 | ......... E05D 15/1042 |
| WO | WO-2010131211 | A2 | * | 11/2010 | ......... E05D 15/1042 |
| WO | WO-2014167539 | A1 | * | 10/2014 | ............. E05D 15/10 |

* cited by examiner

DEVICE FOR A SLIDING DOOR

CROSS-REFERENCE TO RELATED APPLICATIONS

This application is the national phase entry of International Application No. PCT/TR2020/050146, filed on Feb. 25, 2020, the entire contents of which are incorporated herein by reference.

TECHNICAL FIELD

The present invention relates to a device for sliding a door on a cabin. The invention particularly relates to a device for a cupboard having two or more than two doors which are coplanar to each other in a retracted position or overlaps the other in an extracted position, having a linear guide with a first rail and a second rail and being mounted onto the cabin along an upper face thereof; a further guide having a linear portion being parallel to the linear guide and an inclined portion extending transversely to the linear guide; a moving part having a first slide which slidebly runs along the linear guide and a second slide which slidebly runs along the further guide and being displaceble with respect to the first slide from a retracted position to an extracted position or vice versa and being connected to the door by means of a connecting element; the first slide comprising two sliding means running on the first rail and the second rail respectively; a space being defined between the sliding means allowing the second slide to be guided along the further guide; the second slide being displaceble between the sliding means from the retracted position to the extracted position or vice versa when it moves along the inclined portion of the further guide, and the first slide being configured such that it is movable along the linear guide when the second slide is in the extracted position.

BACKGROUND

Such devices are known in the art from the document EP 1 613 831 B1 disclosing a device for sliding doors which have a coplanar closing and a opening in which the doors are slided over each other. The device comprises a pair of carriages fixed to the corresponding door from the upper edge thereof by means of a clamp to provide support, translation and the movement of the door on a cabin. The pair of carriages include two transversal carriages and two longitudinal carriages associated to the respective transversal carriages. The transversal carriages ensure the movement of the door in the depth direction along the longitudinal carriages. The longitudinal carriages ensure the movement of the door in the longitudinal direction along a guide.

Another example of such devices is disclosed in the document EP 3 067 497 B1, having a carriage associated with the sliding door. The carriage is configured with a first and a second outer guide carriage which are associated with a first and a second inner guide carriage. The first and the second outer guide carriage is displaceble in the longitudinal direction of the door, while the first and the second inner guide carriage is movable in relation to the first and the second outer guide carriage.

SUMMARY

The devices of the prior art provide complexity in the mechanisms thus one object of the invention is to ensure a device having a simple embodiment which is rather cheap and easy to install.

Another object of the invention is to provide a device for sliding doors ensuring fine adjustment of the door with respect to cabin. The adjustment mechanism of the device allows to manage the fitting errors in the spatial directions even after the installation of the door onto the cabin.

Further object of the invention is to provide a device having a compact design with reduced components as well as adaptable to be used with small dimensioned doors and also heavy doors.

Sliding doors in the art essentially requires a rail at the bottom of the door besides the carriages at the top in order to support the carriages. Such rails ensure avoiding deviation of the door while being slided on the cabin. By the virtue of the device, the requirement of a rail at the bottom of the cabin is not a requirement. Because during the sliding movement of the door, the both first slide and the second slide of the moving parts are guided on the linear guide and the further guide respectively which are secured on the upper face of the cabin.

Further the device of the invention may comprise a support mechanism to support the door from the bottom in order to avoid also the deviation of the door while being slided on the cabin. Thus the door may optionally be supported by means of the support mechanism, instead of the rail. The support mechanism provides a compact design and is releasably mountable at the bottom of the cabin.

The objects of the invention are achieved with the device having reduced number of components with reduced dimensions and besides that the device is adaptable to be used with the furniture doors with various dimensions.

The device according to the invention comprises a linear guide having a first rail and a second rail, mounted on the top of the cabin in a way that the concavity of the first rail and the second rail face to each other.

The device also comprises a further guide along which the second slide being guided, having a linear portion which is parallel to the linear guide and an inclined portion which extends transversely to the linear guide. The linear portion of the further guide is positioned close to the first rail (front rail) and the inclined portion of the further guide is extending transversely to the second rail (rear rail).

The device further comprises a moving part having a first slide and a second slide for the transportation of the door on the cabin with respect to the horizontal and the depth directions. The first slide slidebly runs along the linear guide with respect to the horizontal direction The second slide slidebly runs along the further guide with respect to both the depth direction and the horizontal direction. The second slide is also displaceble with respect to the first slide from a retracted position to an extracted position or vice versa, and connected to the door by means of a connecting element. The second slide is movable with respect to the first slide in a direction perpendicular to the linear guide. Because the second slide also guides the door on the further guide in the horizontal direction besides the first slide, a reliable transportation of the door on the cabin is assured.

The connecting element of the device is to connect the second slide to door. Advantageously, the moving part of the device comprises an adjustment mechanism allowing the adjustment of the connecting element with respect to the second slide. The adjustment mechanism is associated with the second slide and the connecting element. The connecting element fastened to the door is adjustable with respect to the second slide in the horizontal, the vertical and the depth directions. The adjustment mechanism of the device allows eliminating the fitting errors after the door installed on the cabin. Thanks to adjustment mechanism a fine adjustment is assured and any gap occurred between the cabin and the door is compensated.

The first slide of the device comprises two sliding means running on the corresponding rails of the linear guide (first rail and the second rail respectively). A space is defined between the sliding means allowing the second slide to be guided along the further guide. The second slide of the device is displaceble with respect to the sliding means along from the retracted position to the extracted position or vice versa when it moves along the inclined portion of the further guide, and the first slide being configured such that it is movable along the linear guide when the second slide is in the extracted position.

Each sliding means of the first slide is advantageously configured as a plate having wheels being guided on the rails of the linear guide. While the door moves between the retracted position and the extracted position, the second slide is guided along the inclined portion of the further guide and the first slide at the moment is immobile on the linear guide during this movement.

The device of the invention is configured such that while the door is moved from the retracted position to the extracted position, the second slide moves between the sliding means from the rear to the front, along the inclined portion of the further guide and while the door is moved from the extracted position to the retracted position, the second slide moves between the sliding means from the front to the rear, along the inclined portion of the further guide. In case the door is in the extracted position, it is ready to be slided along the cabin with respect to the horizontal direction. In this sliding position the first slide of the device moves along the linear guide and the second slide also moves along the linear portion of the further guide simultaneously, as the both are secured on the cabin. Thus a reliable sliding movement of the moving part along the linear guide and the further guide with respect to the horizontal direction is ensured.

The connecting element of the device may be in two-part form having a horizontal part and the vertical part. The horizontal part and the vertical part may also be formed as integrally. In two part-from, the horizontal part is pre-mountable to the second slide and the vertical part is pre-mountable to the door and in the installation state of the door onto the cabin, the horizontal part and the vertical part are connected (screwed) to each other via fastening means. Such a configuration ensures easy installation of the door onto cabin.

The device of the invention advantageously comprises a first damping mechanism for damping the movement of the door from the extracted position to the retracted positon. The first damping mechanism comprises a cylinder and piston rod. In this case, the cylinder of the first damping mechanism is releasably placed on the second slide and and the free end of the piston rod is releasably secured on one of the sliding means. While the door moves from the extracted position to the retracted position, the second slide moves between the sliding means from the front to the rear, thereby the first damping mechanism is activated.

The device of the invention may comprise a second damping mechanism for damping the movement of the door in the horizontal direction, while being slided on the cabin. The second damping mechanism is associated with the first slide of the moving part and activated by an actuator. In case the furniture cupboard comprises more than one doors on the cabin, the actuator may be associated with the other moving part defined for the other door.

The device of the invention preferably comprises a force unit having a spring for generating a force to pull the door from the extracted position to the retracted position or to push the door from the retracted position to the extracted position. The spring may be a tension spring which provides a force to pull the door from the extracted position to the retracted position. In this case the door is self-closing door. The spring may be a compression spring which provides a force to push the door from the retracted position to the extracted position. In this case the door is self-opening door.

In this particular embodiment, the spring of the force unit is advantageously placed slightly over a spring guide, one end of which is pivotably secured on the second slide by a mounting piece and guidable within a holder associated with a force adjustment unit. In this case, the force adjustment unit comprises a fixing portion cooperating with a fixing line formed on a supporting element. By means of the fixing portion, the force applied to the door by the spring is fixed. The force adjustment unit allows the device of the invention to be used for any kind of doors with various weight and dimensions.

The device of the invention optionally comprises a support mechanism for supporting the door at the bottom from the innerside to prevent oscillation of the door while being slided. In this particular case, the support mechanism comprises at least two support levers, each of which comprises a rolling body where the door is supported against to, while being slided, the support levers being mounted on a support body in an axially rotating manner and being held thereto with an angle in between by means of a coil spring.

The device of the invention, in this exemplary embodiment, is associated with a cupboard having two doors, however it is conceivable that the device can also be used for the cupboard having two or more than two doors, which are coplanar to each other in the retracted position or overlaps one another in the extracted position.

The invention is explained in more detail below by way of an exemplary embodiment shown in the attached drawings.

REFERENCE NUMBERS

Figure 1:
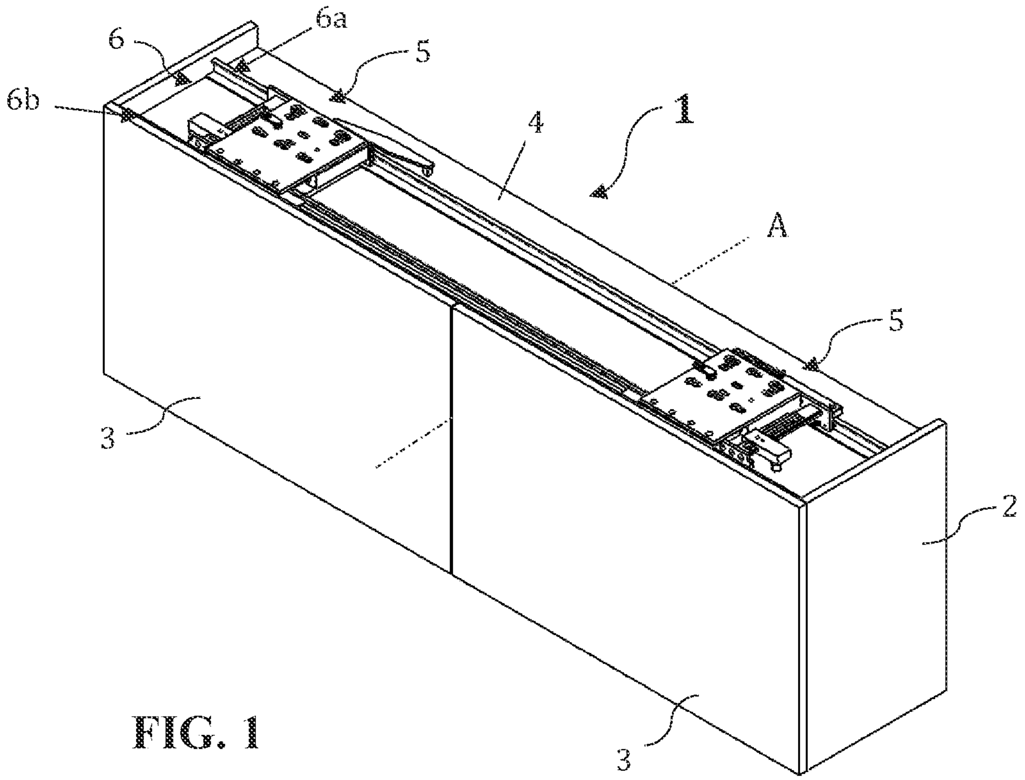
FIG. 1 is a perspective view of a cupboard (1) with two doors (3) associated with a device according to the invention wherein the both doors (3) are coplanar in a retracted position with respect to a cabin (2) and the each door (3) is in in connection with a moving part (5) of the device.

A Symmetry plane
1 Cupboard
2 Cabin
3 Door
3*a* Upper edge
4 Upper face
5 Moving part
51 First slide
51*a*,51*b* Sliding means
51.1 Axles
52 Second slide
52.1 Moving box
52.2 First screw holes
52.3 Toothed rack
6 Linear guide
6*a* First rail
6*b* Second rail
6*c* Distance
6*a*. 1, 6*b*.1 Horizontal way
6*a*.2,6*b*.2 Vertical way
6*d* Open end
7 Further guide
7*a* Linear portion
7*b* Inclined portion
7*c* Terminal body
7*c*.1 Mounting holes
7*c*.2 Receiving portion
8 Horizontal wheel
9 Vertical wheel
10 Connecting element
10.1 Horizontal part
10.2 Vertical part
10.3 First mounting holes
10.3*a* Receiving section
10.3*b* Adjusting section
10.3*c* Bearing
10.4 Fixing hole
10.5 Second mounting holes
10.6 Third mounting holes
10.7 Forth mounting hole
11 Mounting screws
11.1 Screw head
11.2 Knurled portion
11.3 Skirt
12 First damping mechanism
12.1 Cylinder
12.2 Piston rod
12.3 Free end
13 Roller
14 Force unit
14.1 Spring
14.2 Spring guide
14.3 Mounting piece
14.4 Holder
15 Force adjustment unit
15.1 Adjustment part
15.2 Supporting element
15.3 Toothed rod
15.4 First opening
15.5 Fixing means
15.6 Fixing line
16. Second damping mechanism
16.1 Housing
16.2 Catch
16.3 Second damper
17. Actuator
17.1 Base
17.2 Tongue
18 Support mechanism
18.1 Support body
18.2 Support lever
18.2*a* Pivoting region
18.2*b* Arm
18.2*c* Supporting region
18.2*d* Slot
18.2*e* Fixing region
18.2*f* Rolling body
18.3 Coil spring
18.4 Attachment element
18.5 Mounting part
18.5*a* First part
18.5*b* Second part
18.6 Caving
19 Fixing element

DETAILED DESCRIPTION OF THE EMBODIMENTS

Figure 2:
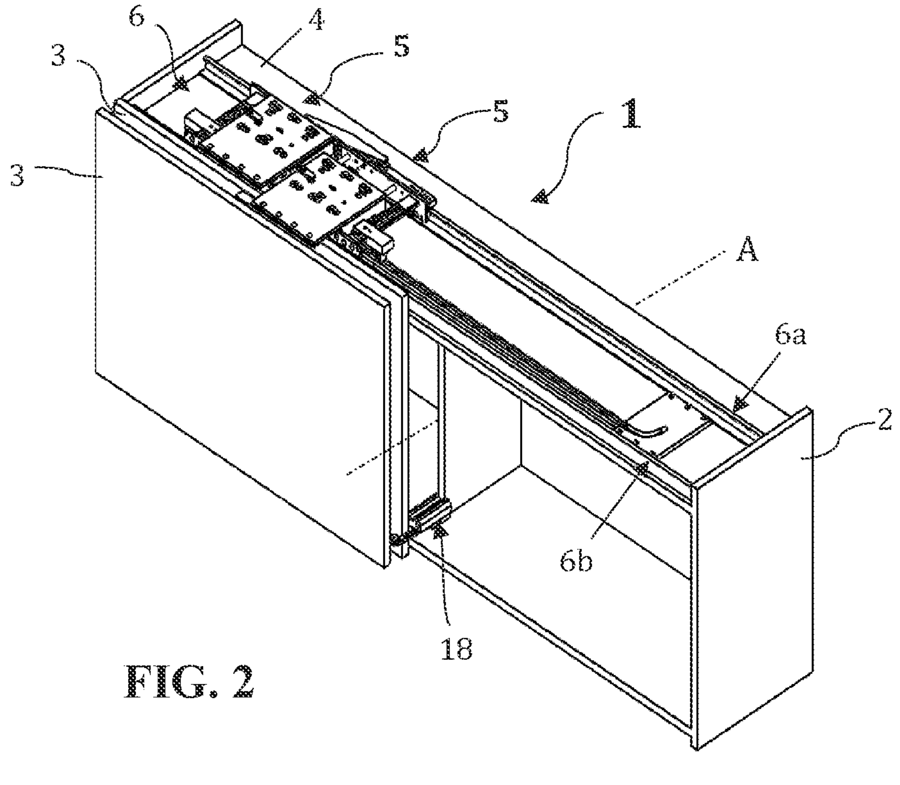
FIG. 2 shows the cupboard (1) with two doors (3) associated with the device according to the invention wherein one of the doors (3) in the extracted position is overlapping the other door (3) in the retracted position.

FIG. 1 shows a cupboard (1) with two doors (3) which are coplanar and close a front opening of the cupboard (1). Each door (3) is associated with the device according to the invention and movable between a position in which the both doors (3) are coplanar to each other, when the doors (3) are in a retracted position (FIG. 1), and a position in which one of the doors (3) overlaps the other (FIG. 2).

Herein the figures, the cupboard (1) comprises two doors (3), however it is of course conceivable that the cupboard (1) comprises more than two doors (3) associated with the device of the invention. In order to provide such cupboards (1) having more than two doors (3), dimensions of the cupboard (1) and the components of the device could be adapted according to the number of the doors (3) on the cupboard (1).

The device according to the invention is installed onto an upper face (4) of a cabin (2) of the cupboard (1). The device associated with one door (3) is in symmetrical structure with respect to the other device associated with the other door (3) by considering a plane "A" as the symmetry plane of the cupboard (1) itself.

Figure 3:
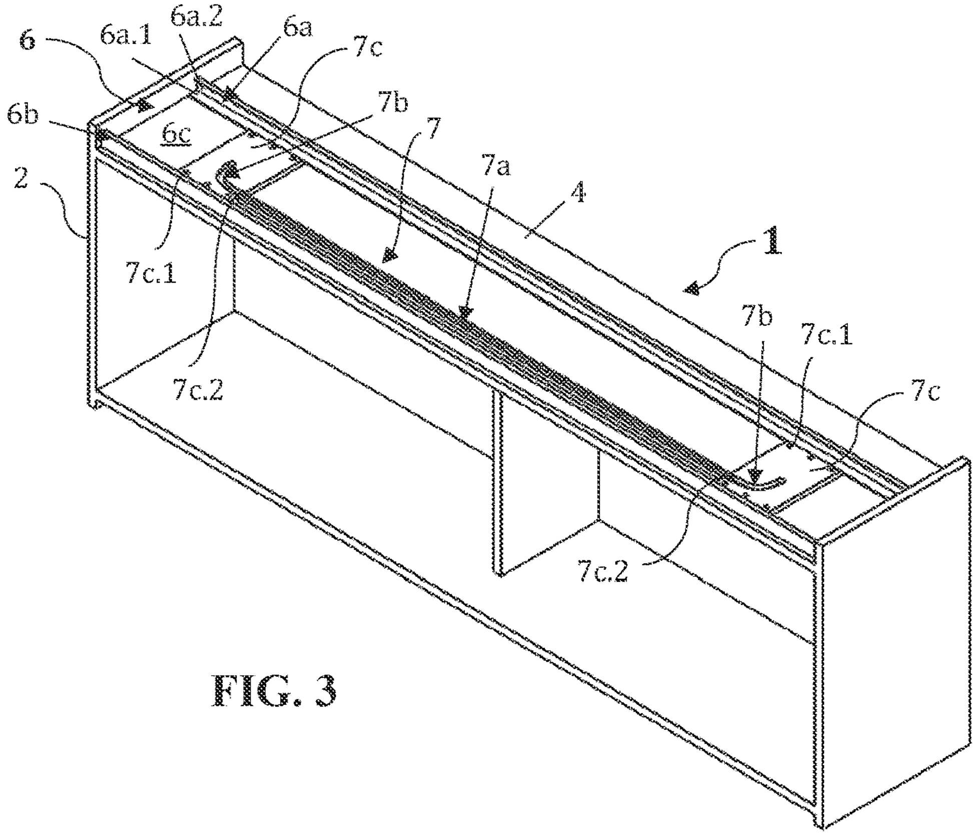
FIG. 3 shows the cabin (2) in a perspective view with a linear guide (6) and a further guide (7) adapted two doors (3) to be guided thereon via the respective moving part (5).

Each device has a common linear guide (6) which extends entire length of the upper face (4) of the cupboard (1) and comprises a first rail (6*a*) and a second rail (6*b*) which are mounted on the upper face (4) so as to be parallel to one another. As seen in FIG. 3, these rails (6*a*, 6*b*) are molded as separate parts and mounted on the upper face (4) such that there is a distance (6*c*) between them, however it is conceivable that these rails (6*a*, 6*b*) could also be formed as a monobloc by being molded on a plate which could lie on the distance (6c) between the rails (6a, 6b).

It is evident that the linear guide (6) may be formed in various length so as to separately guide a moving part (5) of the device which is to be connected to the door (3). In this case the linear guides (6) do not need to be fixed to each other and thus each door (3) could be associated with its own linear guide (6). However, forming a common linear guide (6) along which the moving parts (5) connected to doors (3) are commonly guided is rather cheap and easy to install. Further the length of the linear guide (6) could be adapted according to the number of the doors (3) provided on the cabin (2).

Figure 7:
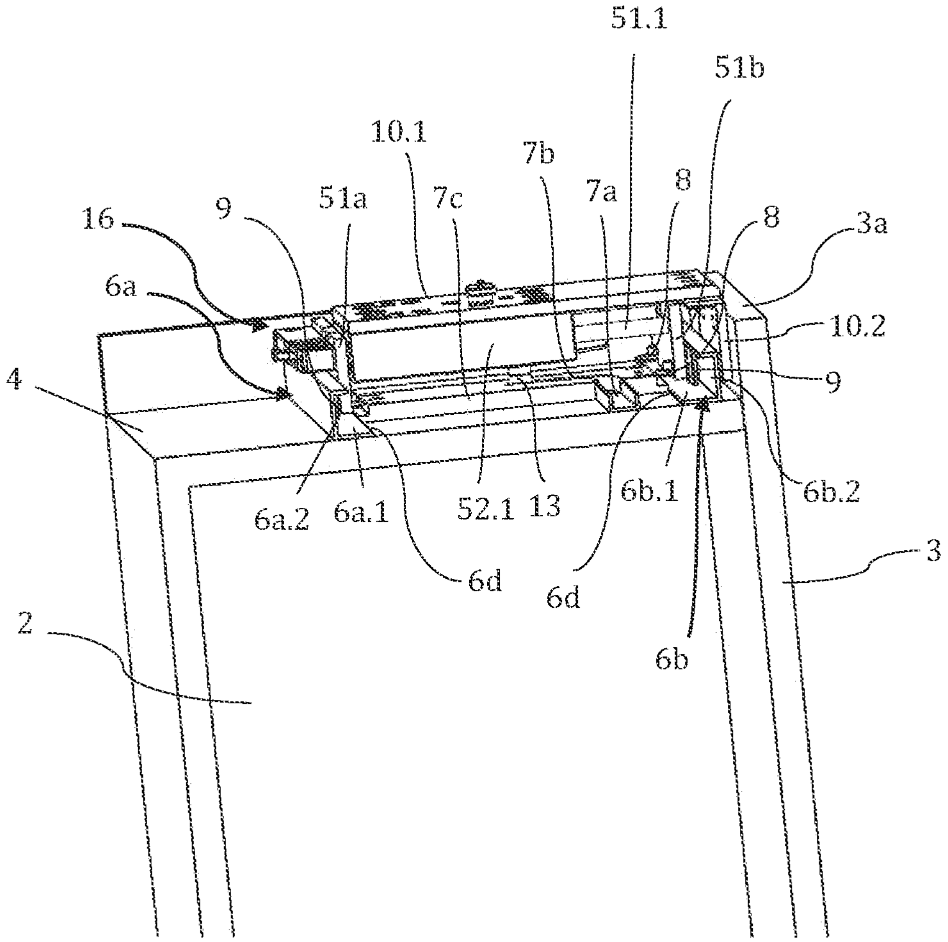
FIG. 7 shows the cupboard (1) with a half cut away wherein the door (3) associated with the device is in the retracted position with respect to the cabin (2).

As better shown in FIG. 7, each rail (6a, 6b) has a "C" shaped profile with a concave form and comprises a horizontal way (6a. 1, 6b.1) and a vertical way (6a.2, 6b.2). In the mounted state, the concavity of the first rail (6a) faces to the concavity of the second rail (6b). The rails (6a, 6b) having a C shaped profile are adapted to receive and guide wheels of the moving part (5) of the device, as will be described below.

As better seen in FIG. 3, each device also comprises a common further guide (7) which is mounted on the upper face (4) of the cabin (2) between the first rail (6a) and second rail (6b) and extends substantially the entire length of the upper face (4) of the cupboard (1). The further guide (7) has a C shaped profile with a concave form facing upward (FIG. 7). The further guide (7) comprises a linear portion (7a) which extends parallel to the rails (6a, 6b) and an inclined portion (7b) at each end of the linear portion (7a). The inclined portion (7b) of the further guide (7) renders a terminal position for the respective door (3) in which the door (3) can be moved between the extracted position and the retracted position with respect to the cabin (2).

Again it is evident that the further guide (7) may be formed in various length so as to separately guide a moving part (5) of the device. In this case the further guides (7) do not need to be fixed to each other and thus each door (3) could be associated with its own further guide (7). However, forming a common further guide (7) along which the moving parts (5) are commonly guided is rather advantageous. In addition the length of the further guide (7) could be adapted according to the number of the doors (3) provided on the cabin (2).

Optionally the further guide (7) may comprise the inclined portion (7b) at one end of the linear portion (7a). In this case the other end of the linear portion (7a) may be formed as a closed end so as to prevent leaving of the moving part (5) from the further guide (7) during sliding. Such a further guide (7) is suitable to guide only one moving part (5) associated with one door (3).

Said linear portion (7a) is positioned closer to the second rail (6b), to the front portion of the cupboard (1), and the inclined portions (7b) advance to the first rail (6a), to the rear portion of the cupboard (1), transversely with respect to the linear portion (7a).

Each inclined portion (7b) may preferably be formed in a terminal body (7c) having a plurality of mounting holes (7c.1) through which the terminal body (7c) is mounted on the upper face (4) via corresponding mounting elements. In this case the terminal body (7c) further comprises a receiving portion (7c.2) into which the linear portion (7a) of the further guide (7) is introduced, thereby the linear portion (7a) is connected to the inclined portion (7b) to form the further guide (7). The linear portion (7a) and the inclined portion (7b) of the further guide (7) may be configured as a separate or an integrated form. The further guide (7) having the linear portion (7a) and the inclined portion (7b) may be secured onto the upper face (4) by means of an attachment device (not shown).

Figure 4:
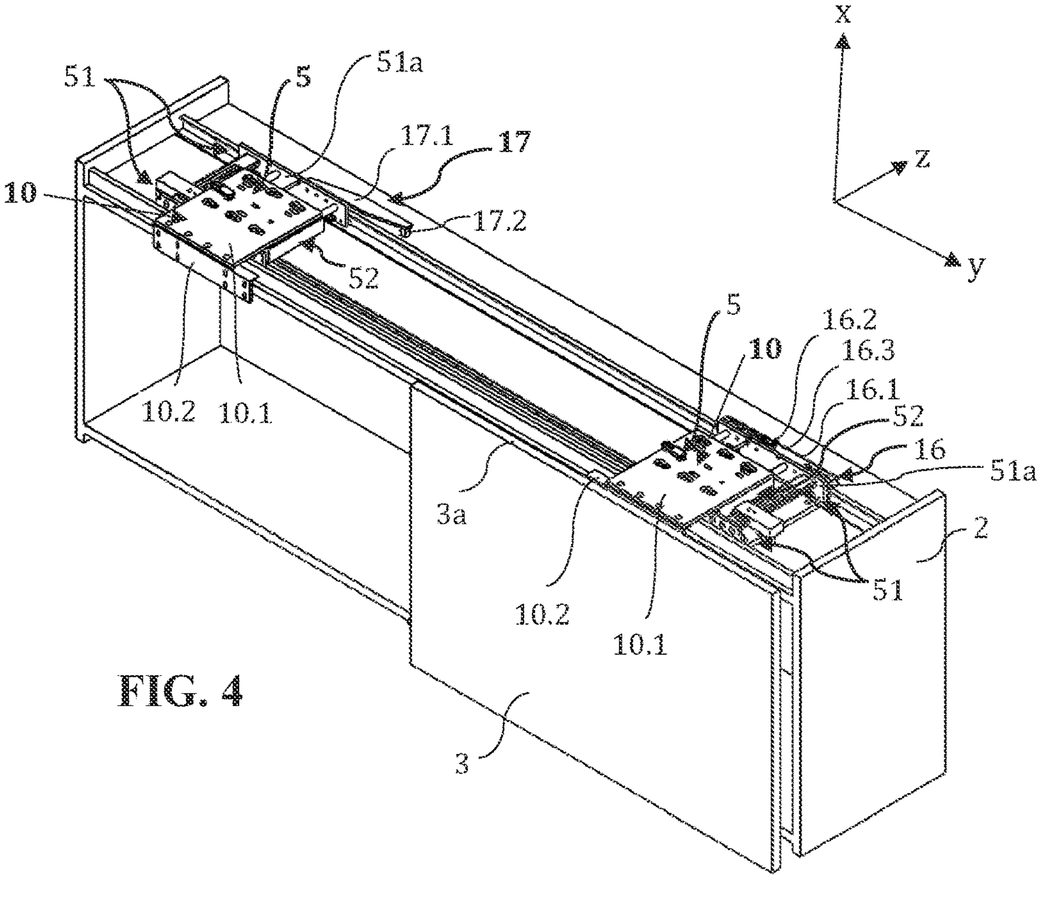
FIG. 4 illustrates the cupboard (1) with one door (3) associated with the respective moving part (5) of the device in the extracted position and the other door (3) is removed from the a connecting element (10) of the respective moving part (5).

The moving part (5) of the device according to the invention is associated with the door (3) thereby the door (3) moves on the cabin (2). FIG. 4 illustrates the cupboard (1) with one door (3) associated with the respective moving part (5), in the extracted position in relation to the cabin (2). Herein the other door (3) of the cupboard (1) is removed from the respective moving part (5). Each moving part (5) comprises a first slide (51), a second slide (52) and a connecting element (10). The connecting element (10) solidly connects the moving part (5) to the door (3) thereby the each door (3) can move on the cabin (2) via the corresponding moving part (5).

The door (3) is adjustable on the cabin (2) with respect to the spatial directions via an adjustment mechanism provided on the moving part (5). Herein the reference (y) corresponds to horizontal direction, the reference (x) corresponds to the vertical direction, and the reference (z) corresponds to the depth direction, as illustrated in FIG. 4.

The connecting element (10) comprises a horizontal part (10.1) and a vertical part (10.2). The vertical part (10.2) is mounted inside the door (3) starting from an upper edge (3a) thereof and the horizontal part (10.1) is mounted onto moving part (5) in an adjustable manner.

The first slide (51) of the moving part (5) is configured to slidebly move along the linear guide (6) and the second slide (52) of the moving part (5) is configured to slidebly move along the further guide (7). The second slide (52) also moves relatively to the first slide (51) in the depth direction (z), along the inclined portion (7b) of the further guide (7), while a user moves the door (3) from the retracted position to the extracted position, or vice versa.

Optionally, depending on the dimensions and the weight of the cupboard (1) and/or the doors (3), more than one moving part (5) may be associated with a door (3) at different distances from each other along the linear guide (6) and the further guide (7).

Figure 5:
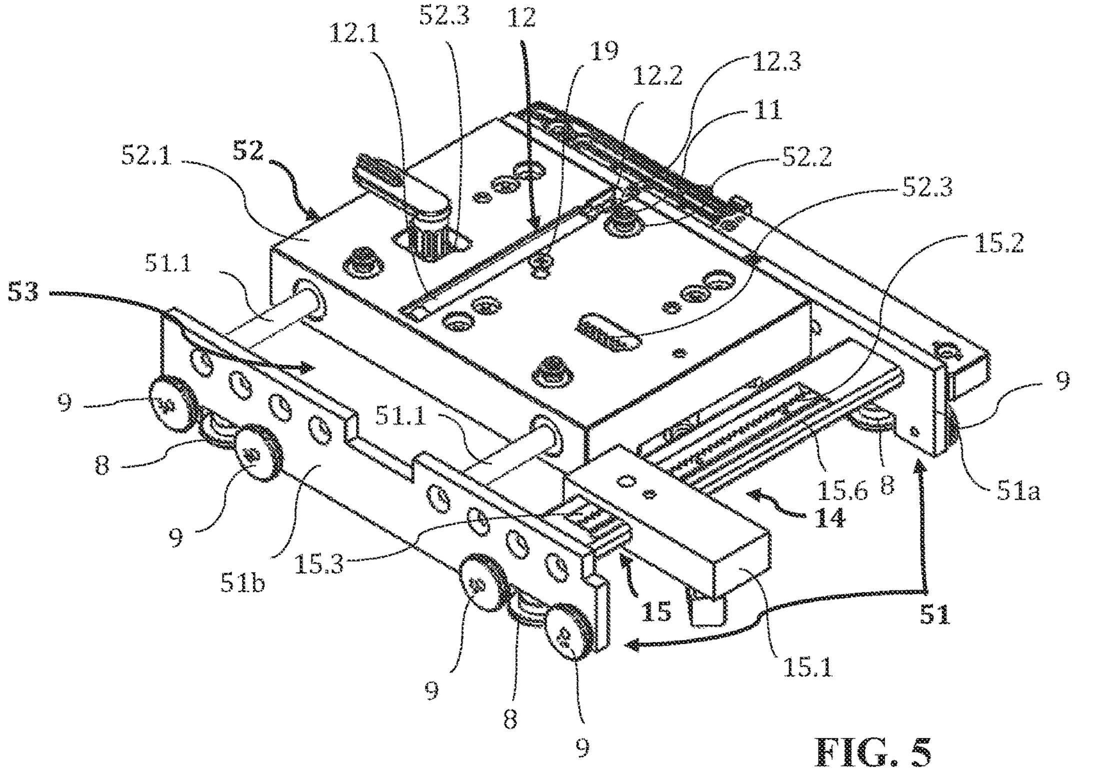
FIG. 5 shows the moving part (5) without the connecting element (10) isolated from the cupboard (1), wherein the position of the moving part (5) corresponds to the retracted position of the door (3) on the cabin (2).
Figure 6:
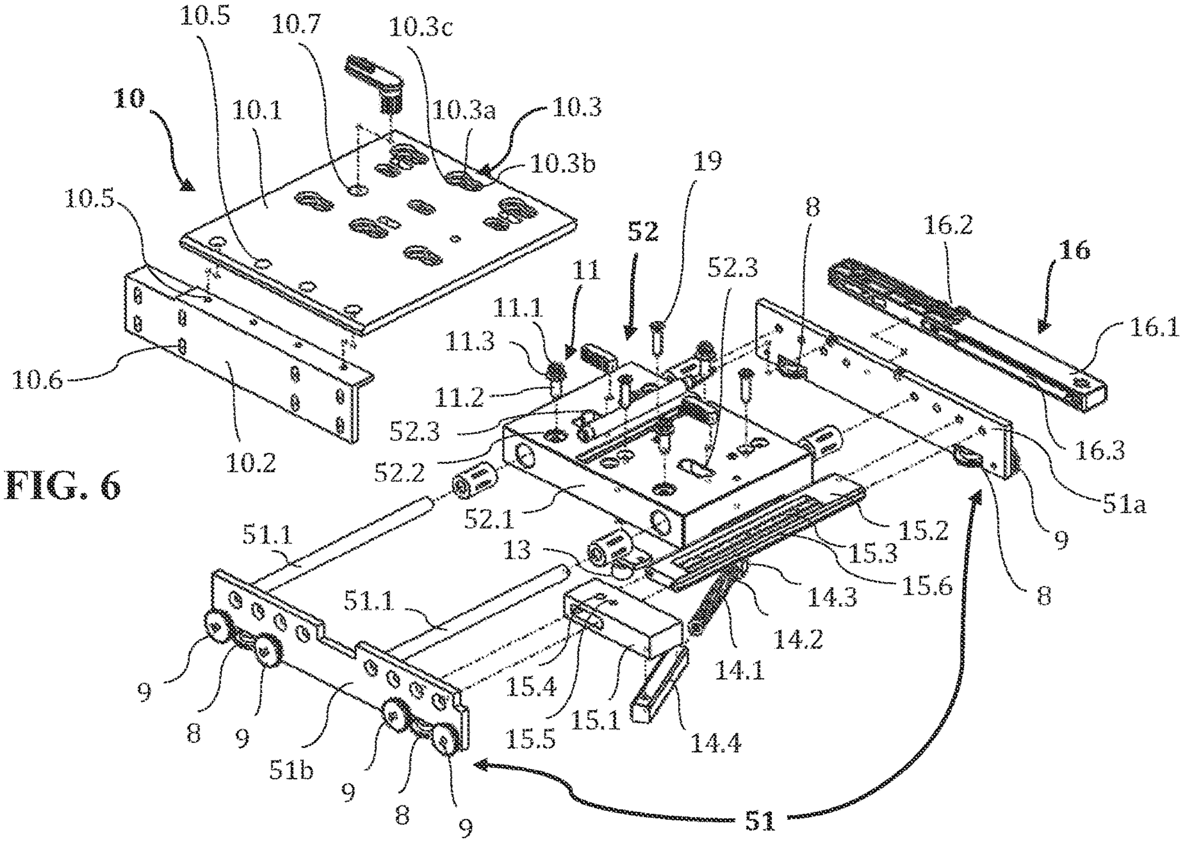
FIG. 6 shows the moving part (5) with the connecting element (10) in an exploded manner.

FIG. 5 shows the moving part (5) without the connecting element (10) isolated from the cupboard (1). Here the position of the moving part (5) corresponds to the retracted position of the door (3) on the cabin (2). FIG. 6 shows the moving part (5) with the connecting element (10) in an exploded manner. As clearly shown in FIGS. 5 and 6, the first slide (51) of the moving part (5) comprises two sliding means (51a, 51b), one of which moves on the first rail (6a) and the other moves on the second rail (6b) respectively (FIG. 7). The sliding means (51a, 51b) run on the first rail (6a) and the second rail (6b) respectively. A space (53) is defined between the sliding means (51a, 51b). The space (53) allows the second slide (52) to be guided along the further guide (7). The second slide (52) of the moving part (5) is displaceble between the sliding means (51a, 51b) from the retracted position to the extracted position or vice versa as it moves along the inclined portion (7b) of the further guide (7). The first slide (51) is configured such that it is movable along the linear guide (6) when the second slide (52) is in the extracted position.

Each sliding means (51a, 51b) is equipped with at least two, preferably four, vertical wheels (9). The vertical wheels (9) are attached to the sliding means (51a, 51b) from the outer side in an axially rotatable manner and run on the respective horizontal ways (6a. 1, 6b.1) with respect to the direction (z). Again each sliding means (51a, 51b) is equipped with at least two horizontal wheels (8). The horizontal wheels (8) are attached to the sliding means (51a,

51*b*) from the under side in an axially rotatable manner and run on the respective vertical ways (6*a*.2, 6*b*.2) with respect to the direction (x) (FIG. 7).

The sliding means (51*a*, 51*b*) are connected to each other by means of two axles (51.1) throughout which a moving box (52.1) of the second slide (52) can move between the sliding means (51*a*, 51*b*) via the connecting element (10) while the door (3) moves from the retracted position to the extracted position, or vice versa.

The adjustment mechanism of the mounting part (5) ensures to compensate connection errors and/or tolerances, which may happen between the door (3) and the cabin (2), in the spatial directions. The adjustment mechanism allows adjustment of the connecting element (10) with respect to the second slide (52). Working principles of the adjustment mechanisms will be explained in detail below.

As shown in FIG. 5, said adjustment mechanism comprises a plurality of mounting screws (11) on the moving box (52.1) to provide connection between the horizontal part (10.1) of the connecting element (10) and the moving box (52.1) of the second slide (52). In this exemplary embodiment there are provided three mounting screws (11) which allow the horizontal part (10.1) to be mounted onto the moving box (52.1) in a secure manner, however it is of course conceivable that the number of the mounting screws (11) may vary. The moving box (52.1) comprises a plurality of first screw holes (52.2) for accepting the corresponding mounting screws (11). Preferably the mounting screws (11) are screwed into the first screw holes (52.2) prior to fastening of the horizontal part (10.1) of the connecting element (10) to the moving box (52.1). As may be seen in FIG. 6, each mounting screw (11) comprises a knurled portion (11.2), a screw head (11.1) which has a larger diameter than the knurled portion (11.2) and a skirt (11.3) circumferentially formed around the knurled portion (11.2), away from the screw head (11.1). In the mounting state, the mounting screw (11) is screwed into the first screw hole (52.2) until the skirt (11.3) reaches a stop in the first screw hole (52.2), thus the skirt (11.3) and the corresponding stop prevent advancing of the mounting screw (11) into the first screw hole (52.2) further. In this case the screw head (11.1) remains off the first screw hole (52.2), namely the moving box (52.1).

The horizontal part (10.1) of the connecting element (10) comprises a plurality of first mounting holes (10.3) corresponding to the mounting screws (11). Each first mounting hole (10.3) comprises a receiving section (10.3*a*) and an adjusting section (10.3*b*) extended from the receiving section (10.3*a*). During assembly, the horizontal part (10.1) of the connecting element (10) is placed onto the moving box (52.1) such that the each screw head (11.1) passes through the corresponding receiving section (10.3*a*), thus the connecting element (10) is ready to be fastened onto the moving box (52.1). When the mounting screw (11) is turned by a tool, preferably a screw driver, the screw head (11.1) proceed on a bearing (10.3*c*) formed in the first mounting holes (10.3), around the receiving section (10.3*a*) and the adjusting section (10.3*b*), thereby the connecting element (10) moves in the horizontal direction (y) with respect to the moving box (52.1) and the sliding means (51*a*, 51*b*).

Thanks to the mounting screws (11) of the adjustment mechanism, besides that the connecting element (10) is connected to the second slide (52), the position of the same with respect to the second slide (52), thus the position of the door (3) with respect to the cabin (2), in the horizontal direction (y) is adjusted by turning the mounting screw (11) within the first mounting holes (10.3). In the mounting state, the connecting element (10) has a clearance from the sliding means (51*a*, 51*b*), thus it can move free from the first slide (51).

Advantageously the horizontal part (10.1) and the vertical part (10.2) may be formed as separate parts to allow easy assembling of the door (3) onto the cabin (2). In this case, the horizontal part (10.1) and the vertical part (10.2) comprises a plurality of corresponding second mounting holes (10.5) through which the horizontal part (10.1) previously connected to the moving box (52.1) and the vertical part (10.2) previously connected to the door (3) via a plurality of third mounting holes (10.6) are mounted to each other during assembling.

Alternatively, the adjustment mechanism comprises at least one, optionally two, toothed rack (52.3) defined on the moving box (52.1), through which the horizontal adjustment of the door (3) with respect to the cabin (2) can be performed. A fourth mounting hole (10.7) is provided on the horizontal part (10.1) of the connecting element (10) corresponding to said toothed rack (52.3). The connecting element (10) is adjusted with respect to the second slide (52) by means of that a tool is turned on the toothed rack (52.3), thus the position of the door (3) with respect to the cabin (2) in the horizontal direction (y) is adjusted.

The adjustment mechanism further comprises a fixing element (19) on the second slide (52), immobilizing the position of the connecting element (10) onto the second slide (52) after the fine adjustments of the door (3) with respect to the cabin (2) is realized. In order to adjust the position of the door (2) with respect to the cabin, the fixing element (19) first needs to be loosen and after the adjustment it needs to be squeezed again. The fixing element (19) provided on the moving box (52.1) cooperates with a corresponding fixing hole (10.4) provided on the horizontal part (10.1) of the connecting element (10).

Advantageously each device according to the invention may comprise a first damping mechanism (12) damping the door (3) in the closing direction. The first damping mechanism (12) comprises a cylinder (12.1) and a piston rod (12.2) guiding a piston within the cylinder (12.1). The first damping mechanism (12) is releasably mounted on the second slide (52) such that it is substantially placed in the moving box (52.1) and a free end (12.3) of the piston rod (12.2) is secured on the sliding means (51*a*, 51*b*).

During the movement of the door (3) from the retracted position to the extracted position, the second slide (52) is driven on the axles (51.1) between the sliding means (51*a*, 51*b*), from the rear to the front of the cupboard (1), via the connecting element (10) connected to the door (3) and the first damping mechanism (12) is simultaneously being set to damp the door (3). When the door (3) moves from the extracted position to the retracted position, the second slide (52) is driven on the axles (51.1) between the sliding means (51*a*, 51*b*), from the front to the rear of the cupboard (1), via the connecting element (10), thus the first damping mechanism (12) is activated, and consequently the closing speed of the door (3) is softened.

As shown in FIGS. 6 and 7, the moving part (5) comprises a roller (13) engaged with the second slide (52). The roller (13) is mounted underside of the moving box (52.1) to allow the second slide (52) to be guided along the further guide (7). The roller (13) moves along the inclined portion (7*b*) while the second slide (52) moves on the axles (51.1) between the sliding means (51*a*, 51*b*) which corresponds to retracting or extracting movement of the door (3) with respect to the cabin (2) in the direction (z). When the roller (13) starts moving on the linear portion (7*a*) of the further guide (7), simultaneously the first slide (51) also starts moving on the linear guide (6) which corresponds to sliding movement of the door (3) on the cabin (2) in the horizontal direction (y).

Each moving part (5) further comprises a force unit (14) having a spring (14.1). The spring (14.1) is slightly placed over a spring guide (14.2). One end of the spring guide (14.2) is pivotably secured underside of the moving box (52.1) via a mounting piece (14.3) and the spring (14.1) with the spring guide (14.2) is guidable within a holder (14.4) during the retracting or extracting position.

The spring (14.1) could be a tension spring. In this case, the spring (14.1) permanently attempts to pull the door (3) to the cabin (2) and provides closing force to retract the door (3) from the extracted position to the retracted position. While the door (3) is closed itself, simultaneously the second slide (52) moves between the sliding means (51*a*, 51*b*), from the front to the rear of the cupboard (1).

The spring (14.1) could be a compression spring. In this case, the spring (14.1) permanently attempts to push the door (3) away from the cabin (2) and provides opening force to extract the door (3) from the closed position to the extracted position. While the door (3) is extracted itself, simultaneously the second slide (52) moves between the sliding means (51*a*, 51*b*), from the rear to the front of the cupboard (1). Because the door (3) provides self-opening, a holding means is needed in order to keep the door (3) in the closed position and prevent opening of the door (3) unintentionally.

The force applied to the door (3) by means of the force unit (14) is adjustable via a force adjustment unit (15). The force adjustment unit (15) comprises an adjustment part (15.1) which is connected to the holder (14.4) of the force unit (14). Said adjustment part (15.1) is slidably movable during the adjustment of the force throughout a supporting element (15.2) disposed between the sliding means (51*a*, 51*b*). The force adjustment unit (15) comprises a toothed rod (15.3) substantially extending on the supporting element (15.2). The adjustment part (15.1) provides a first opening (15.4) which associates with the toothed rod (15.3). The position of the adjustment part (15.1) over the supporting element (15.2), thus the tension of the spring (14.1), can be adjusted through the first opening (15.4). A tool, for example a screw driver, is turned in the first opening (15.4) and associates with the toothed rod (15.3), and as a consequence the adjustment part (15.1) moves back and forth over the supporting element (15.2).

The force adjustment unit (15) further comprises a fixing means (15.5) on the adjustment part (15.1), cooperating with a fixing line (15.6) formed on the supporting element (15.2). The fixing line (15.6) is parallelly extending next to the toothed rod (15.3). The position of the adjustment part (15.1) on the supporting element (15.2), thus the force applied to the door (3) by the spring (14.1), is defined through the fixing means (15.5). The fixing means (15.5) is secured on the fixing line (15.6) by means of a tool, for example a screw driver, and as a consequence position of the adjustment part (15.1) on the supporting element (15.2) is anchored.

FIG. 7 shows a perspective view of the cupboard (1) in half cut away wherein one of the moving parts (5) associated with the respective door (3) is in connection with the linear guide (6) and the further guide (7). As may clearly be seen in FIG. 7, the horizontal ways (6*a*. 1, 6*b*.1) of the each rail (6*a*, 6*b*) advantageously provide a smooth movement area for the vertical wheels (9) thus those vertical wheels (9) can move thereon without any interruption. Similarly the vertical ways (6*a*.2, 6*b*.2) of the each rail (6*a*, 6*b*) advantageously form a smooth movement area for the horizontal wheels (8) thus those horizontal wheels (8) can also move thereto without any interruption. The height of the vertical ways (6*a*.2, 6*b*.2) is defined suitable with the diameter of the vertical wheels (9) and likewise the width of the horizontal ways (6*a*. 1, 6*b*.1) is also formed as suitable with the diameter of the horizontal wheels (8).

In this exemplary embodiment, the horizontal ways (6*a*. 1, 6*b*.1) of the each rail (6*a*, 6*b*) are formed with an open end (6*d*), however in an alternative embodiment the horizontal ways (6*a*. 1, 6*b*.1) could be provided with a limiting element proceeding upward from the open end (6*d*) to prevent the deviation of the horizontal wheels (8) from the horizontal ways (6*a*. 1, 6*b*.1) while being guided and thereby the oscillation of the door (3) during sliding may be avoided.

The device according to the invention may advantageously comprise a second damping mechanism (16) to decelerate the movement of the door (3) while being slided on the cabin (2) with respect to the horizontal direction (y). The second damping mechanism (16) is activated by means of an actuator (17). In this exemplary embodiment, the second damping mechanism (16) is engaged with the moving part (5). As shown in FIG. 7, the second damping mechanism (16) is attached to outside of the rear sliding means (51*a*) of the first slide (51), thus it can move with the moving part (5). There is provided a clearance between the second damping mechanism (16) and the first rail (6*a*).

In FIG. 4, an exemplary actuator (17) is shown. The actuator (17) is also attached to sliding means (51*a*) of the other moving part (5) from the outside, thus the actuator (17) can move with the moving part (5). There is also provided a clearance between the first rail (6*a*) and the actuator (17).

The second damping mechanism (16) can be attached to any of the moving part (5) while the actuator (17) is attached to the other corresponding moving part (5) as the second damping mechanism (16) cooperates with the actuator (17) such that when one of the doors (3) slides in the horizontal direction (y), the second damping mechanism (16) is activated with the actuator (17) to reduce the speed of the sliding door (3). However it is conceivable that the second damping mechanism (16) and the corresponding actuator (17) is attached else where on the cabin (2) so as to decelerate the movement of the door (3) while sliding.

In this exemplary embodiment, as shown in FIG. 4, the actuator (17) comprises a base (17.1) and a tongue (17.2) extending downward from the base (17.1). The second damping mechanism (16) comprises housing (16.1) where a second damper (16.3) associated with a catch (16.2) is located. The tongue (17.2) interacts with the catch (16.2) thereby the second damper (16.3) is activated and reduce the speed of the door (3). In the contrary movement, when the catch (16.2) and the tongue (17.2) is separated, the catch (16.2) comes back to its initial position by means of tensioning force of the second damper (16.3).

The device of the invention may advantageously comprise a support mechanism (18) to support the doors (3) from the innerside. The support mechanism (18) applies supporting force to the door (3). Thanks to the support mechanism (18), the oscillation of the door (3) while being slided on the cabin (2) is avoided.

In this exemplary embodiment, as seen in FIG. 2, the support mechanism (18) is mounted on the bottom of the cabin (2) and located on the symmetry plane (A). Advantageously the support mechanism (18) is supported from the behind by a separator in the cabin (2).

Figure 8:
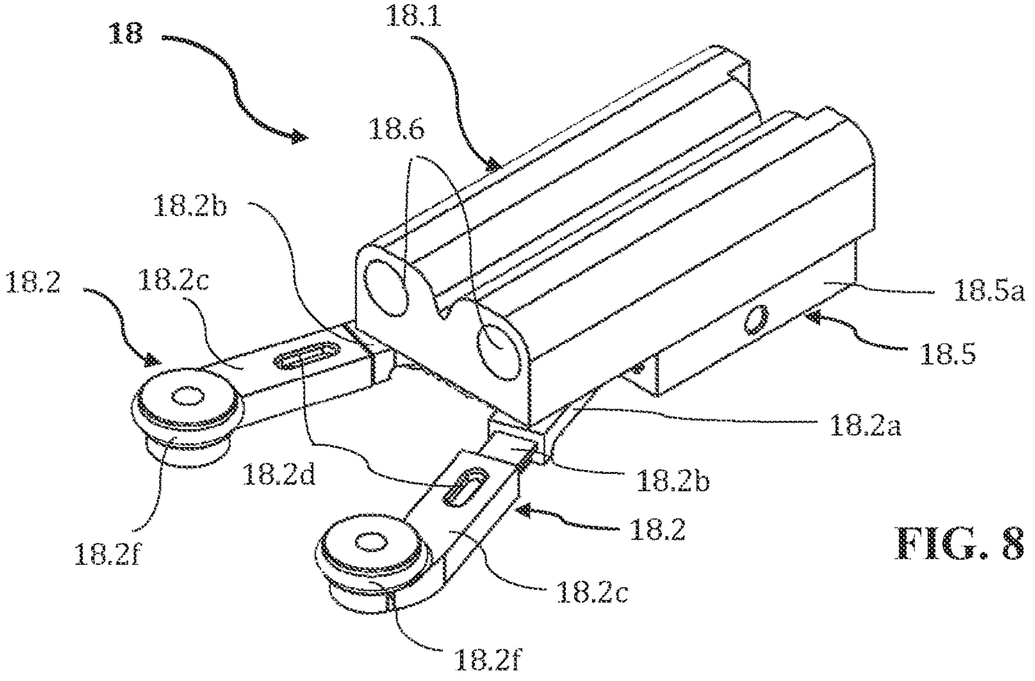
FIG. 8 shows a support mechanism (18) of the device in an isolated manner from the cabin (2), having two support levers (18.2) mounted on a support body (18.1) so as to be angled each other by means of a coil spring (18.3).
Figure 9:
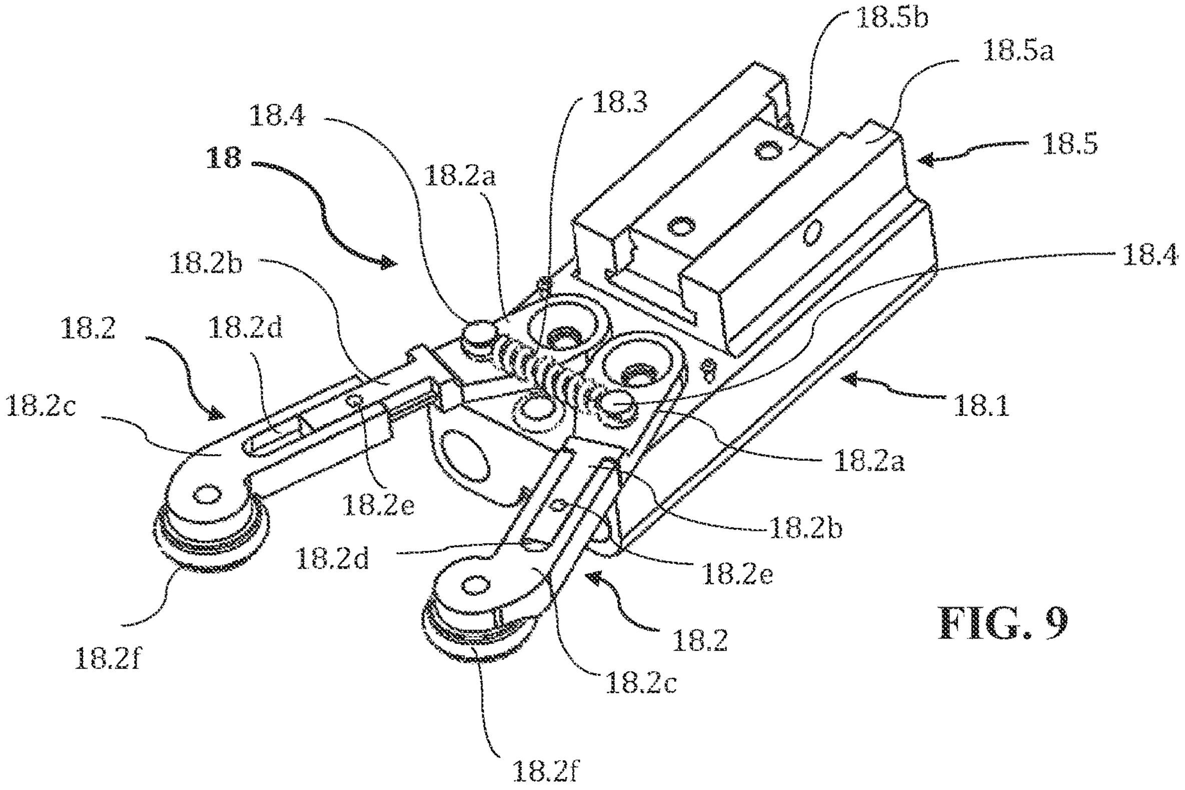
FIG. 9 shows the support mechanism (18) of FIG. 8 from underneath.

FIG. 8 shows the support mechanism (18) in an isolated manner and FIG. 9 shows the same from underneath. The support mechanism (18) comprises a support body (18.1)

and two support levers (18.2) mounted on the support body (18.1) in an axially rotating manner. The support levers (18.2) are held on the support body (18.1) with an angle in between ensured by a coil spring (18.3). Each support lever (18.2) is in contact with the each door (3) by applying supporting force thereto during the entire sliding movement thereof. While the door (3) slides on the cabin (2), the support lever (18.2) axially rotates on the support body (18.1) and follows the sliding movement of the door (3). The support lever (18.2) supports the respective door (3) by applying force thereto from the inner. Each door (3) being slided by the moving part (5) from the top and being supported by the support mechanism (18) from the bottom, thus the oscillation of the door (3) is avoided and synchronizated movement of the door (3) in the bottom and the top is achieved while sliding.

Each support lever (18.2) comprises a pivoting region (18.2*a*), a arm (18.2*b*) and a supporting region (18.2*c*). Each pivoting region (18.2*a*) comprises an attachment element (18.4) where the end of the coil spring (18.3) is fixed and thus keep the support lever (18.2) angled to each other.

The arm (18.2*b*) of the support lever (18.2) is connected to the pivoting region (18.2*a*) at the end away from the axially pivoting point. The arm (18.2*b*) is guided within a slot (18.2*d*) provided on the supporting region (18.2*c*). The length of the support lever (18.2) according to the distance from the door (3) can be adjusted by sliding the arm (18.2*b*) in the slot (18.2*d*). There is provided a fixing region (18.2*e*) on the arm (18.2*b*) where the position of the arm (18.2*b*) within the slot (18.2*d*) of the supporting region (18.2*c*) is fixed.

Each support lever (18.2) comprises a rolling body (18.2*f*) at the end of the supporting region (18.2*c*) away from the arm (18.2*b*). The rolling body (18.2*f*) is pivotably rotatable the with respect to the vertical axis. The rolling body (18.2*f*) of the support lever (18.2) rolls onto the respective door (3) while it slides and supports the door (3) from the innerside.

The support mechanism (18) further comprises a mounting part (18.5) for mounting of the support body (18.1) onto the bottom of the cabin (2). The mounting part (18.5) may comprise a first part (18.5*a*) and a second part (18.5*b*). The second part (18.5*b*) can be secured on the bottom of the cabin (2) and first part (18.5*a*) is inserted on the second part (18.5*b*) in a sliding manner until the rear portion of second part (18.5*b*) abuts to the separator in the cabin (2).

Thanks to the device of the invention the door (3) of the cupboard (1) can be opened with or without a handle. In order to ease of opening of the door (3) the support mechanism (18) may advantageously comprise two cavings (18.6) adjacent to each other within the support body (18.1). A push-open device (not shown) may be located within each caving (18.6) to open the door (3) with the help of pushing force applied to the door (3) by means of the push-open device.

Figure 10:
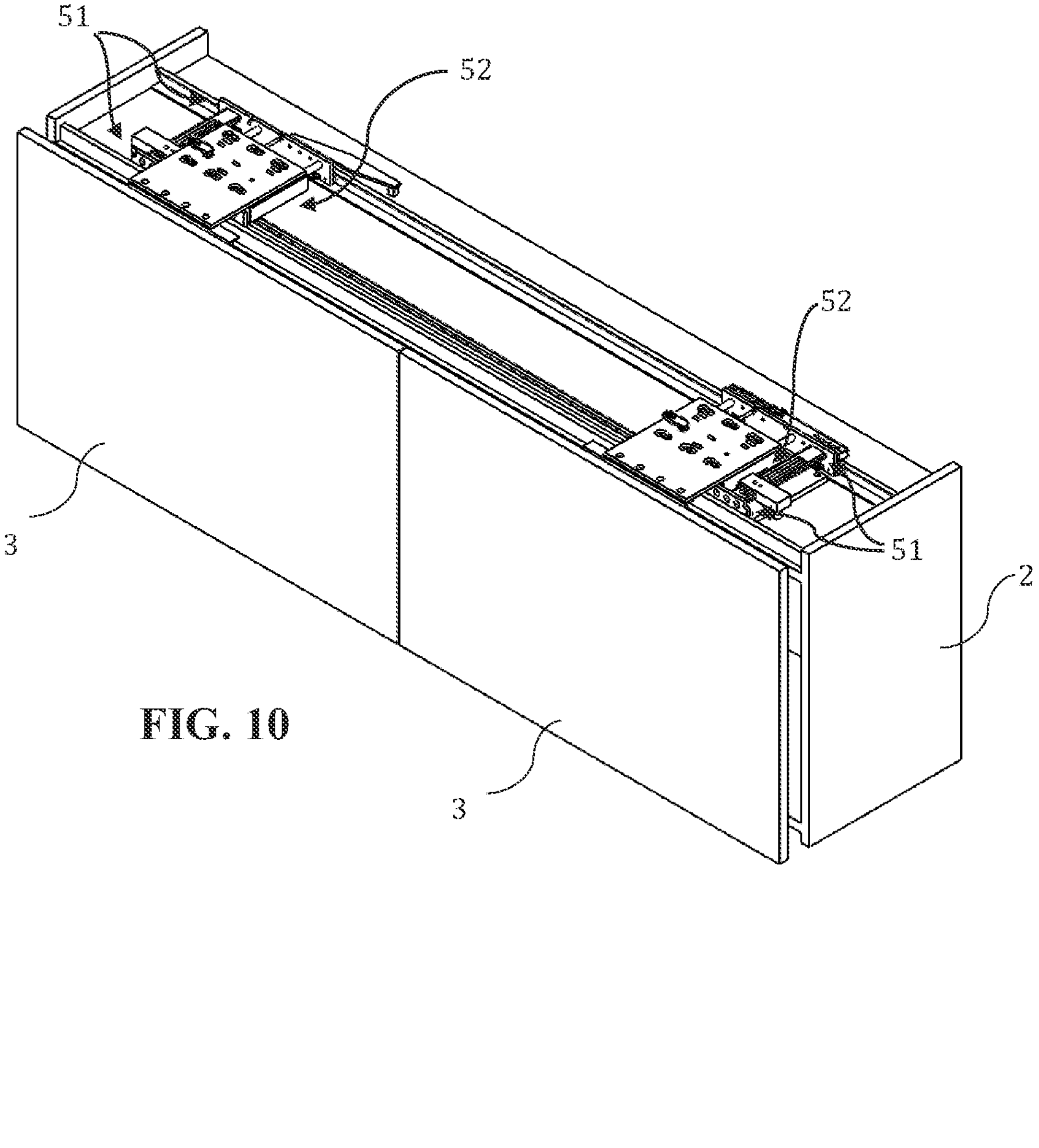
FIG. 10 is a perspective view of a cupboard (1) with two doors (3) associated with the device according to the invention wherein the both doors (3) are coplanar in a extracted position with respect to a cabin (2) and being in connection with the respective moving part (5) of the device.

FIG. 10 shows the cupboard (1) with two doors (3) in an extracted position. In order to slide the door (3) on the cabin (2) with respect to the horizontal direction (y), a user first needs to move the door (3) from the retracted (closed) position, shown in FIG. 1, to the extracted position, shown in FIG. 4 or FIG. 10. This movement may be ensured by means of the force unit (14) of the moving part (5), in case the spring (14.1) of the force unit (14) is a compression spring, self-opening door (3). Or it may be ensured by the push-open device (not shown). During this movement the second slide (52) of the moving part (5) moves between the sliding means (51*a*, 51*b*) from the rear to the front of the cupboard (1) and the roller (13) attached to second slide (52) runs on the inclined positon (7*b*) of the further guide (7) towards the linear portion (7*a*) until the door (3) reaches to the extracted position. In case the spring (14.1) of the force unit (14) is a tension spring, self-closing door (3), the user itself needs to draw the door (3) until it reaches to the the extracted position. During the movement of the door (3) from the retracted position to the extracted position, the first slide (51) of the moving part (5) is immobile on the linear guide (6), contrary to the second slide (52).

When the door (3) is in the extracted position, the user can slide the door (3) on the cabin (2) with respect to the horizontal direction (y) as he desires, providing that the adjacent door (3) is in the retracted position, in this exemplary embodiment of the cupboard (1). In FIG. 2, one door (3) is in the retracted position closing the corresponding opening of the cabin (2) while the other door (3) is in the extracted position, overlapping the retracted one.

However it is of course conceivable that the dimensions of the device of the invention can be adapted to be compatible with such configurations which allow both adjacent doors (3) are in the extracted position and slide over each other at the same time. During the sliding movement of the door (3) on the cabin (2), the first slide (51) slides on the linear guide (6) and the second slide (52) slides on the linear portion (7*a*) of the further guide (7).

In order to close the door (3), the user first needs to draw the sliding door (3) to the extracted position. When the door (3) is in the extracted position, the user subsequently pushes the door (3) to the retracted position. This movement may be ensured by means of the force unit (14) of the moving part (5), in case the spring (14.1) of the force unit (14) is a tension spring, self-closing door (3). During this movement the second slide (52) of the moving part (5) moves between the sliding means (51*a*, 51*b*) from the front to the rear of the cupboard (1) and the roller (13) attached to second slide (52) runs on the inclined positon (7*b*) of the further guide (7) away from the linear portion (7*a*) until the door (3) reaches to the retracted position. In case the spring (14.1) of the force unit (14) is a compression spring, self-opening door (3), the user itself needs to push the door (3) until it reaches to the the extracted position. In this case a holding means is required to hold the door (3) in the retracted position. During the movement of the door (3) from the extracted position to the retracted position, the first slide (51) of the moving part (5) is againg immobile on the linear guide (6), contrary to the second slide (52).

The invention claimed is:

1. A device for sliding a door on a cabinet, comprising a linear guide having a first rail and a second rail and being mounted on the cabinet along an upper face of the cabinet, wherein the both rails are opposite to one another;

a further guide having a linear portion and an inclined portion, wherein the linear portion is parallel to the linear guide and the inclined portion extends transversely to the linear guide, a moving part having a first slide and a second slide, wherein the first slide slidably runs along the linear guide and the second slide slidably runs along the further guide, the second slide is displaceable with respect to the first slide from a retracted position to an extracted position or from the extracted position to the retracted position and the second slide is connected to the door by a connecting element;

wherein the first slide comprises two sliding means running on the first rail and the second rail respectively, a space is defined between the two sliding means allowing the second slide to be guided along the further guide, the second slide is displaceable between the two sliding means from the retracted position to the extracted position or from the extracted position to the retracted position when the second slide moves along the inclined portion of the further guide, the first slide is configured to be movable along the linear guide when the second slide is in the extracted position, and the second slide comprises a first damping mechanism for damping a movement of the door from the extracted position to the retracted position, having a cylinder and a piston rod, and a free end of the piston rod is releasably secured on one of the two sliding means.

2. The device according to claim 1, wherein the moving part comprises at least one axis, the second slide displaces along the at least one axis between the two sliding means from the retracted position to the extracted position or from the extracted position to the retracted position.

3. The device according to claim 1, wherein the connecting element is in two-part form having a horizontal part pre-mountable to the second slide and a vertical part pre-mountable to the door, in an installation state, the horizontal part and the vertical part are connected to each other to allow the door to slide on the cabinet via the moving part.

4. The device according to claim 1, wherein the moving part comprises an adjustment mechanism configured to adjust the connecting element with respect to the second slide.

5. The device according to claim 1, wherein the moving part comprises a second damping mechanism for damping the door while being slid in a horizontal direction, wherein the second damping mechanism is activated by an actuator during sliding.

6. The device according to claim 1, wherein the moving part comprises a force unit having a spring for generating a force to pull the door from the extracted position to the retracted position or to push the door from the retracted position to the extracted position.

7. The device according to claim 6, wherein the spring is placed slightly over a spring guide, one end of the spring guide is pivotably secured on the second slide by a mounting piece and guidable within a holder associated with a force adjustment unit.

8. The device according to claim 6, wherein the spring is a tension spring.

9. The device according to claim 6, wherein the spring is a compression spring.

10. The device according to claim 7, wherein the force adjustment unit comprises a supporting element extending between the two sliding means and an adjustment part slidably movable throughout a supporting element in an adjustment state, and a tension of the spring is adjusted by the force adjustment unit.

11. The device according to claim 10, wherein the force adjustment unit comprises a fixing portion cooperating with a fixing line formed on the supporting element, and a force applied to the door by the spring is fixed.

12. The device according to claim 1, wherein the device comprises a support mechanism for supporting the door from an innerside to prevent oscillation of the door while being slid.

13. The device according to claim 12, wherein the support mechanism comprises at least two support levers, each of the at least two support levers comprises a rolling body, wherein the door is supported against to the rolling body while being slid, the at least two support levers are mounted on a support body in an axially rotating manner and held on the support body with an angle in between by a coil spring.

14. A cupboard, comprising two doors slidably movable on a cabinet, associated with the device according to claim 1.

15. The device according to claim 2, wherein the connecting element is in two-part form having a horizontal part pre-mountable to the second slide and a vertical part pre-mountable to the door, in an installation state, the horizontal part and the vertical part are connected to each other to allow the door to slide on the cabinet via the moving part.

16. The device according to claim 2, wherein the moving part comprises an adjustment mechanism configured to adjust the connecting element with respect to the second slide.

17. The device according to claim 3, wherein the moving part comprises an adjustment mechanism configured to adjust the connecting element with respect to the second slide.

18. The device according to claim 2, wherein the second slide comprises a first damping mechanism for damping a movement of the door from the extracted position to the retracted position, having a cylinder and a piston rod, and a free end of the piston rod is releasably secured on one of the two sliding means.

19. The device according to claim 3, wherein the second slide comprises a first damping mechanism for damping a movement of the door from the extracted position to the retracted position, having a cylinder and a piston rod, and a free end of the piston rod is releasably secured on one of the two sliding means.

20. A device for sliding a door on a cabinet, comprising a linear guide having a first rail and a second rail and being mounted on the cabinet along an upper face of the cabinet, wherein the both rails are opposite to one another;

a further guide having a linear portion and an inclined portion, wherein the linear portion is parallel to the linear guide and the inclined portion extends transversely to the linear guide, a moving part having a first slide and a second slide, wherein the first slide slidably runs along the linear guide and the second slide slidably runs along the further guide, the second slide is displaceable with respect to the first slide from a retracted position to an extracted position or from the extracted position to the retracted position and the second slide is connected to the door by a connecting element;

wherein the first slide comprises two sliding means running on the first rail and the second rail respectively, a space is defined between the two sliding means allowing the second slide to be guided along the further guide, the second slide is displaceable between the two sliding means from the retracted position to the extracted position or from the extracted position to the retracted position when the second slide moves along the inclined portion of the further guide, the first slide is configured to be movable along the linear guide when the second slide is in the extracted position, the moving part comprises a force unit having a spring for generating a force to pull the door from the extracted position to the retracted position or to push the door from the retracted position to the extracted position, and the spring is placed slightly over a spring guide, one end of the spring guide is pivotably secured on the second slide by a mounting piece and guidable within a holder associated with a force adjustment unit.

* * * * *